(12) United States Patent
Albou et al.

(10) Patent No.: US 11,235,698 B2
(45) Date of Patent: Feb. 1, 2022

(54) CALIBRATION OF A LIGHT MODULE WITH LIGHT-EMITTING ELEMENTS

(71) Applicant: VALEO VISION, Bobigny (FR)

(72) Inventors: Pierre Albou, Bobigny (FR); Vincent Godbillon, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/227,540

(22) Filed: Dec. 20, 2018

(65) Prior Publication Data

US 2019/0200427 A1 Jun. 27, 2019

(30) Foreign Application Priority Data

Dec. 22, 2017 (FR) ...................................... 1763077

(51) Int. Cl.
*H05B 47/105* (2020.01)
*H05B 45/18* (2020.01)
(Continued)

(52) U.S. Cl.
CPC .............. *B60Q 1/143* (2013.01); *B60Q 3/18* (2017.02); *H05B 45/14* (2020.01); *H05B 45/18* (2020.01); *H05B 47/105* (2020.01)

(58) Field of Classification Search
CPC ...... H05B 45/10; H05B 45/14; H05B 47/105; B60Q 3/18; B60Q 1/143; B60Q 2200/38;
(Continued)

(56) References Cited

U.S. PATENT DOCUMENTS 9,295,112 B2 * 3/2016 Knapp ................... H05B 45/20
2002/0097000 A1    7/2002 Muthu et al.
(Continued)

FOREIGN PATENT DOCUMENTS

CN          1419797 A      5/2003
CN        101438093 A      5/2009
(Continued)

OTHER PUBLICATIONS

French Preliminary Search Report issued Aug. 31, 2018 in French Application 17 63077, dated Dec. 22, 2017 (with English Translation of Categories of Cited Documents).
(Continued)

*Primary Examiner* — Henry Luong
(74) *Attorney, Agent, or Firm* — Oblon, McClelland, Maier & Neustadt, L.L.P.

(57) ABSTRACT

A method for calibrating a light module including a set of light-emitting elements, the method including powering the light-emitting elements so as to obtain an image projected by the light module, the projected image including a set of pixels, each pixel corresponding to at least one subset of at least one light-emitting element of the light source; for each pixel of the projected image, comparison of a difference between a light intensity of the pixel with a predefined light intensity of a corresponding pixel of a reference image, with a threshold; in the case where the difference is above the predetermined threshold, determination of a modified power supply value of at least one first light-emitting element of the subset corresponding to the given pixel; and storage, in a memory of the light module, of the modified power supply value in association with an identifier of the subset including the first light-emitting element.

7 Claims, 4 Drawing Sheets

(51) Int. Cl.
*H05B 45/14* (2020.01)
*B60Q 1/14* (2006.01)
*B60Q 3/18* (2017.01)

(58) Field of Classification Search
CPC ...... B60Q 2300/31; F21S 41/00; F21S 43/00; G03B 21/008; F21W 2107/10
See application file for complete search history.

(56) References Cited

U.S. PATENT DOCUMENTS

| | | | |
|---|---|---|---|
| 2009/0212709 A1 | 8/2009 | Meijer et al. | |
| 2011/0069094 A1* | 3/2011 | Knapp | H05B 33/08 345/690 |
| 2012/0019164 A1 | 1/2012 | Gambeski et al. | |
| 2015/0237688 A1 | 8/2015 | Gambeski et al. | |
| 2016/0013362 A1* | 1/2016 | Heo | H01L 33/06 315/291 |
| 2016/0347237 A1 | 12/2016 | Bhakta et al. | |
| 2017/0141154 A1 | 5/2017 | Cha et al. | |
| 2017/0238396 A1 | 8/2017 | Knibbe et al. | |
| 2018/0067308 A1* | 3/2018 | Sakai | G02B 27/0101 |

FOREIGN PATENT DOCUMENTS

| | | |
|---|---|---|
| CN | 106200219 A | 12/2016 |
| FR | 3 021 393 A1 | 11/2015 |
| FR | 3 048 845 A1 | 9/2017 |
| WO | WO 2016/023754 A1 | 2/2016 |

OTHER PUBLICATIONS

Office Action dated Oct. 29, 2020 in Chinese Application No. 201811578710.7, along with an English translation (16 pgs).

* cited by examiner

CALIBRATION OF A LIGHT MODULE WITH LIGHT-EMITTING ELEMENTS

The present application relates to the calibration of a light module comprising a light source, for a motor vehicle capable of emitting a beam of light rays along a longitudinal axis.

Light modules should be understood to be any device capable of emitting light, in particular for lighting and/or signalling and/or interior lighting in the motor vehicle.

Such a light module to this end incorporates a light source. The light sources used for lighting and signalling in motor vehicles are increasingly commonly composed of light-emitting diodes, in particular for advantages of bulk and of autonomy compared to conventional light sources. The use of light-emitting diodes in the lighting and/or signalling modules has also allowed the players in the market (motor vehicle constructor and designer of lighting and/or signalling devices) to add a creative touch to the design of these devices, particularly for the use of an ever-increasing number of these light-emitting diodes to produce optical effects.

Light modules are for example known that comprise an imager capable of spatially modulating the light intensity of a light beam from a light source.

One example of such a light module is illustrated with reference to FIG. 1.

The light module 1 comprises a light source 100, such as a light-emitting diode source or a laser diode source capable of emitting a light beam 108. The light source 100 can be driven by a driver module 102, also simply called "driver".

The light beam 108 is collimated by a collimation unit 101, that can comprise one or more lenses.

The beam 108 is thus collimated towards an imager 103 which spatially modulates the light intensity of the beam and directs the modulated beam towards a projection unit 104. The projection unit 104 can comprise lenses and a reflector and is capable of projecting the light beam towards the outside of the motor vehicle, in order to produce a light function.

In such a light module comprising several units producing respective functions, production or mounting defects are likely to impact the uniformity of the beam. For example, when the light module is designed to obtain a reference image on a screen 105, some pixels of the image obtained by projection of the light beam 108 can, in practice, differ from corresponding pixels of the reference image.

The reference image can for example be a uniform white rectangle in which all of the pixels have the same light intensity. The image obtained by a light module 1 exhibiting a defect can however appear on the screen 205 as illustrated with reference to FIG. 2.

In FIG. 2, the image 201 obtained by projection onto the screen comprises dark zones 202, and the image 201 thus differs from the uniform reference image.

Such defects can be provoked by:
the optics of the collimation and projection units 101 and 104. In this case, and as illustrated in FIG. 2, a vignetting effect can appear on the projected image 201;
a defect in the light source 100 provoking a non-uniform light beam 108 from the source;
a defect in the imager 103, in particular a defect in the coefficient of transmission or reflection, global or local, of the imager 103;
a fabrication tolerance of the elements of the light module, this tolerance being able to affect the size or the form of said elements;
a defect of positioning of the elements of the light module among one another upon the assembly thereof.

There is thus a need to correct or compensate for the defects of fabrication or of assembly of a light module. Such a need is in no way specific to the light module 1 illustrated in FIG. 2 and applies to any light module.

A first aspect of the invention relates to a method for calibrating a light module comprising a light source comprising a set of light-emitting elements arranged on one and the same substrate, the method comprising the following steps:
powering all of the light-emitting elements so as to obtain an image projected by the light module, the projected image comprising a set of pixels, each pixel corresponding to at least one subset of at least one light-emitting element of the light source, each subset being capable of being powered individually with current;
for each pixel of the projected image, comparison of a difference between a light intensity of the pixel with a predefined light intensity of a corresponding pixel of a reference image, with a predetermined threshold;
in the case where, for at least one given pixel of the projected image, the difference is above the predetermined threshold, determination of a modified power supply value of at least a first light-emitting element of the subset corresponding to the given pixel;
storage, in a memory of the light module, of the modified power supply value in association with an identifier of the subset comprising the first light-emitting element.

The use of a light source with light-emitting elements grouped together in subsets that are individually addressable and that correspond to pixels of the projected image, makes it possible to correct defects of the light module, which defects are inevitable during production or during assembly. Furthermore, such a correction or calibration is performed without requiring modifications of the optical elements of the light module: the correction relies on the storage of modified power supply values for at least some of the subsets of light-emitting elements. The light-emitting elements are intrinsically capable of accepting a power supply different from a nominal value and, thus, the calibration does not induce degradation of the light source.

In one embodiment, the method can also comprise a step of setting the temperature of the light module to a given temperature value, and, in the storage step, the modified power supply value can be stored in association with an identifier of the subset comprising the first light-emitting element and with the given temperature value.

In fact, the ranges of operation of light-emitting elements are greatly dependent on the surrounding temperature. It is thus particularly advantageous to store the modified power supply value in association with the temperature value for which it is calculated.

In addition, the steps of the method can be iterated, and, on each iteration, the light module can be set to a temperature with a temperature value different from the temperature value of the preceding iteration.

Thus, the accuracy of the calibration is enhanced and the images projected by the light module are close to the reference image whatever the temperature around the light module.

Finally, the method can be applied for several electrical power supply values of the pixels. The correction can then be done for a temperature with a given power supply value, or by interpolation between the stored values of these different parameters.

A second aspect of the invention relates to a computer program comprising instructions for the implementation of the steps of the method according to the first aspect of the invention, when these instructions are executed by a processor.

A third aspect of the invention relates to a system for calibrating a light module comprising a light source comprising a set of light-emitting elements arranged on one and the same substrate, the system comprising:
- a control unit for controlling the power supply of all of the light-emitting elements so as to obtain an image projected by the light module onto a screen of said system, the projected image comprising a set of pixels, each pixel corresponding to at least one subset of at least one light-emitting element of the light source, each subset being able to be powered individually with current;
- a camera suitable for acquiring images of the image projected onto the screen;
- a processor for, for each pixel of the projected image, comparing a difference between a light intensity of said pixel with a predefined light intensity of a corresponding pixel of a reference image, with a predetermined threshold.

The processor can also be suitable for, in the case where, for at least one given pixel of the projected image, the difference is above the predetermined threshold, determining a modified power supply value of at least one first light-emitting element of the subset corresponding to the given pixel, in order to store the modified power supply value in association with an identifier of the subset comprising the first light-emitting element in a memory of the light module.

A fourth aspect of the invention relates to a light module comprising:
- at least one light source comprising a set of light-emitting elements arranged on one and the same substrate, said set of light-emitting elements comprising subsets of at least one light-emitting element, each subset being able to be powered individually with current;
- a memory storing power supply values in association with identifiers of subsets of light-emitting elements;
- a driver unit capable of powering the subsets of the light-emitting source as a function of the associated power supply values;

in which, on reception of a modified power supply value in association with a given identifier of a subset of light-emitting elements, the memory is capable of storing the modified power supply value in association with the given identifier of the subset, and in which the driver unit powers the identified subset as a function of the modified power supply value.

According to one embodiment, the light module can also comprise a temperature sensor capable of measuring a current temperature value, in particular a current temperature value in proximity to the light source, in particular on the light source, and, on reception of a modified power supply value in association with a given identifier of a subset of light-emitting elements and with a given temperature value, the memory is capable of storing the modified power supply value in association with the given identifier of the subset and with the given temperature value. If an identifier of a subset is associated with several modified power supply values and respective temperature values, the driver module is capable of selecting the modified power supply value associated with the temperature value closest to the current temperature value. Alternatively, the driver module is capable of calculating an interpolation of the power supply value as a function of the power supply values corresponding to a lower temperature, in particular the temperature immediately lower, and to a higher temperature, in particular the temperature immediately higher than the current temperature value.

Thus, the defects of the light module are compensated for with accuracy whatever the surrounding temperature.

In addition, the light module can also comprise a focussing unit capable of focussing a light beam from the light source, an imager capable of spatially modulating the light intensity of the focussed beam, and a projection unit capable of projecting the modulated light beam towards the outside of the light module.

In addition, the imager can be a matrix of micromirrors.

According to one embodiment of the invention, the light-emitting elements can be light-emitting rods of submillimetric dimension or light-emitting blocks.

The use of light-emitting rods or blocks of submillimetric dimension makes it possible to enhance the accuracy of the correction, through their small size.

Other features and advantages of the invention will become apparent on studying the following detailed description, and the attached drawings in which:

FIG. 3 illustrates a system for calibrating a light module 2 according to an embodiment of the invention.

Figure 1:
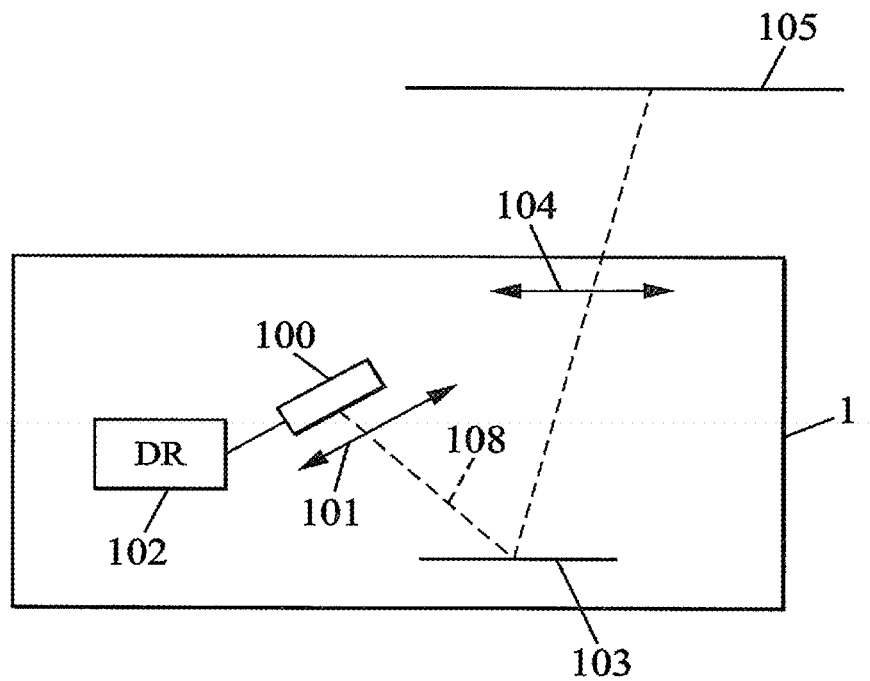
FIG. 1 illustrates a light module according to the prior art.

As an illustration, a light module 2 has been represented in which the structure is close to that of the light module 1 of FIG. 1: the light module 2 comprises a light source 100, a collimation unit 101, a driver unit 102, an imager 103 and a projection unit 104. The common elements between the light module 2 and the light module 1 are therefore identified by common references.

The invention proposes calibrating the light module 2, in which the light source 100 is a light source comprising a plurality of light-emitting elements arranged on one and the same substrate. The light-emitting elements are divided up into subsets of at least one light-emitting element, each subset being individually addressable. According to some embodiments, a subset comprises several light-emitting elements that can be driven individually. It will thus be understood that the invention applies to any light module comprising a source comprising a plurality of light-emitting elements, and regardless of the optical system used to project a light beam to the outside of the light module 2.

As will be better understood on reading the following, the use of such a light source allows for an accurate calibration and makes it possible to compensate for production and assembly defects at lower costs.

The imager 103 can be a matrix of micromirrors of DMD type, DMD standing for "Digital Micromirror Device", a transparent or reflecting LCD module or an L-COS module, L-COS standing for "Liquid Crystal On Silicon".

The light source 100, and in particular each of the subsets of light-emitting elements, is driven by the driver unit 102, which is also linked to a memory 106 according to the invention. The light module 2 can also comprise an interface 107 capable of exchanging data with a calibration module 109.

Such an interface 107 is optional according to the invention since the calibration method can provide for the calibration module 109 to directly access the memory 106 of the light module 2.

The light module 2 can also comprise a temperature sensor 208 capable of measuring a current and ambient temperature value.

The calibration module 9 can comprise an interface 111 and a processor 110, capable of being connected to a camera 112 placed in front of the screen 105. In one embodiment, the camera 112 is incorporated in the calibration module 109.

Figure 4:
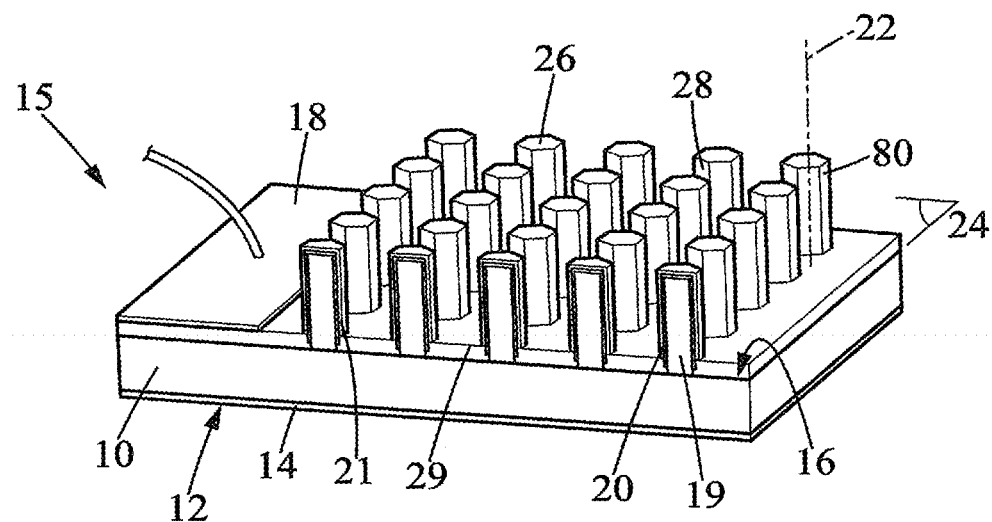
FIG. 4 illustrates a light source of a light module according to an embodiment.

FIG. 4 illustrates a set 15 of light-emitting elements according to an embodiment of the invention.

In FIG. 4, by way of example, the light-emitting elements are light-emitting rods 80 of submillimetric dimensions, that will hereinafter be called light-emitting rods. These light-emitting rods 80 emerge from one and the same substrate 10. Each light-emitting rod 80, here formed by the use of gallium nitride GaN, extends at right angles, or substantially at right angles, protruding from the substrate 10 here produced based on silicon, other materials such as silicon carbide being able to be used for the substrate without departing from the context of the invention. As an example, the light-emitting rods 80 could be produced from a compound based on aluminium nitride and gallium nitride AlN/GaN, or from a compound based on aluminium, indium and gallium AlN/GaN/InGaN.

Figure 2:
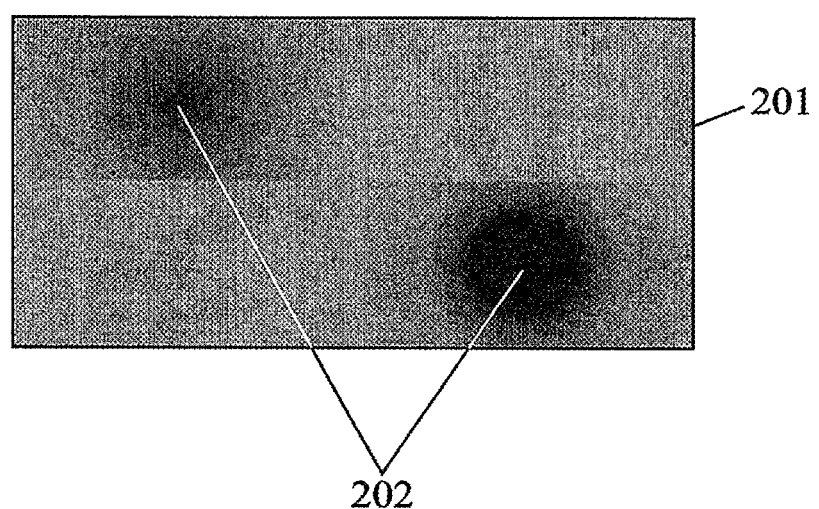
FIG. 2 illustrates an image projected onto a screen by a light module according to the prior art, comprising defects.

In FIG. 2, the substrate 10 has a bottom face 12, onto which is added a first electrode 14, and a top face 16, from which the light-emitting rods 80 protrudingly extend and on which is added a second electrode 18.

It should be noted that only one subset of light-emitting rods 80 is represented in FIG. 4. However, as explained before, the set of light-emitting elements can comprise several subsets of at least one light-emitting element. In this case, one or more of the electrodes 14 and 18 can be dedicated to one and the same subset, so that each subset can be powered individually, that is to say independently of the other subsets.

Different layers of materials are superposed on the top face 16, in particular after the growth of the light-emitting rods from the substrate here.

Among these different layers, there can be at least one layer of electrically conductive material, in order to allow for the electrical powering of the light-emitting rods 80. This layer is etched so as to link the rods of each individually addressable subset of the first set 2 of the light source 6 to one another.

The light-emitting rods 80 of submillimetric dimensions stretch from the substrate 10 and each comprise, as can be seen in FIG. 2, a core 19 of gallium nitride, around which are arranged quantum wells 20 formed by a radial superpositioning of layers of different materials, here of gallium nitride and of gallium-indium nitride, and a shell 21 surrounding the quantum wells, also produced in gallium nitride.

Each rod extends along a longitudinal axis 22 defining its height, the base 23 of each rod being arranged in a plane 24 of the top face 16 of the substrate 10.

The light-emitting rods 80 advantageously have the same form. These light-emitting rods 80 are each delimited by a terminal face 26 and by a circumferential wall 28 which extends along the longitudinal axis. When the light-emitting rods 80 are doped and are subjected to a polarization, the resulting light at the output of the light source 100 is emitted primarily from the circumferential wall 28, it being understood that it is possible to provide for light rays to also exit, at least in small quantities, from the terminal face 26. The result thereof is that each light-emitting rod 80 acts as a single light-emitting diode and that the density of the light-emitting rods 80 enhances the brightness of the light source 100.

The circumferential wall 28 of a light-emitting rod 80, corresponding to the shell of gallium nitride, is covered by a layer of transparent conductive oxide TCO 29 which forms the anode of each rod complementing the cathode formed by the substrate.

This circumferential wall 28 extends along the longitudinal axis 22 from the substrate 10 to the terminal face 26, the distance from the terminal face 26 to the top face 16 of the substrate, from which the light-emitting rods 80 emerge, defining the height of each light-emitting rod 80. As an example, provision can be made for the height of a light-emitting rod 80 to be between 1 and 10 micrometres, while provision can be made for the greatest transverse dimension of the terminal face, at right angles to the longitudinal axis 22 of the light-emitting rod concerned, to be less than 2 micrometres.

It is also possible to provide for the surface of a light-emitting rod 80 to be defined, in a cutting plane at right angles to this longitudinal axis 22, within a determined range of values, and in particular between 1.96 and 4 square micrometres.

These dimensions, given by way of nonlimiting example, make it possible to demarcate a light source 100 comprising light-emitting rods of a light source with planar light-emitting diodes.

The invention does however also cover the case in which the light-emitting rods 80 of the light source 100 are planar light-emitting diodes. It thus applies to any light source 100 comprising a plurality of light-emitting elements.

It will also be possible to provide for other particular dimensions of the light source 100 according to the invention, and in particular a dimension of the lighting surface for example of at most 10×10 mm². The density of the light-emitting rods 80 and the area of the lighting surface can also be calculated for the luminance obtained by the plurality of light-emitting rods to be for example at least 60 Cd/mm². The optimal dimension of the lighting surface of the light source 100 will depend on the function targeted.

The height of the light-emitting rods 80 can also be modified within the light source 100, so that some light-emitting rods can have a different height from other light-emitting rods.

The form of the light-emitting rods 80 can also vary, particularly on the section of the rods and on the form of the terminal face 26. Light-emitting rods have been illustrated in FIG. 4 that have a cylindrical overall form, and in particular a form of polygonal section, here more particularly hexagonal. It is understood that it is important for the light to be able to be emitted through the circumferential wall, that the latter has a polygonal or circular form for example.

Figure 5:
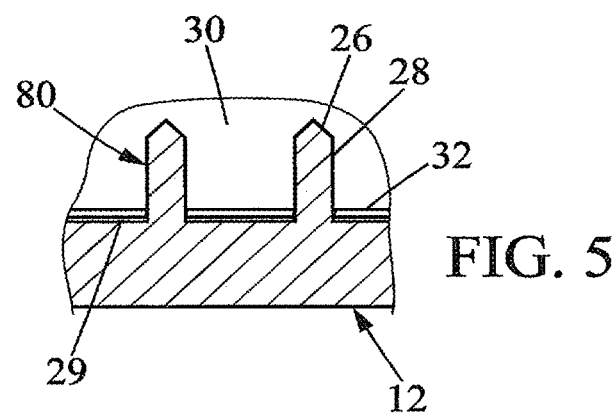
FIG. 5 is a cross-sectional view of a light source of a light module according to an embodiment.

Moreover, the terminal face 26 can have a form that is substantially planar and at right angles to the circumferential wall, such that it extends substantially parallel to the top face 16 of the substrate 10, as is illustrated in FIG. 4, or else it can have a dished or pointed form at its centre, so as to multiply the directions of emission of the light exiting from said terminal face, as is illustrated in FIG. 5.

In FIG. 4, the light-emitting rods 80 are arranged in a two-dimensional matrix forming a subset. Such a subset can for example correspond to a pixel of the projected image, and the light source 100 can thus comprise several subsets corresponding to respective pixels. One subset comprises at least one light-emitting rod 80.

This arrangement could be such that the light-emitting rods are arranged staggered. The invention covers other distributions of the rods, with in particular rod densities which can be variable from one subset to another.

The light source 100 can also comprise, as illustrated in FIG. 5, a layer 30 of a polymer material in which light-emitting rods 80 are at least partially embedded. The layer 30 can thus extend over the entire extent of the subset or only around just one pixel.

The polymer material, which can in particular be based on silicone, makes it possible to protect the light-emitting rods 80 without hindering the diffusion of the light rays.

It is generally possible to incorporate in this layer 30 of polymer material wavelength conversion means, and, for example, luminophores, capable of absorbing at least a part of the rays emitted by one of the light-emitting rods 80 and of converting at least a part of said absorbed excitation light into an emission light having a wavelength different from that of the excitation light.

The light source 100 can also comprise a coating 32 of light-reflecting material, which is arranged between the light-emitting rods 80 to deflect rays initially oriented towards the substrate 10 towards the terminal face 26 of the light-emitting rods 80. In other words, the top face 16 of the substrate 10 can comprise a reflecting means which returns the light rays, initially oriented towards the top face 16, towards the output face of the light source 100. Rays which would otherwise be lost are thus recovered. This coating 32 is arranged between the light-emitting rods 80 on the layer of transparent conductive oxide 29.

Figure 6:
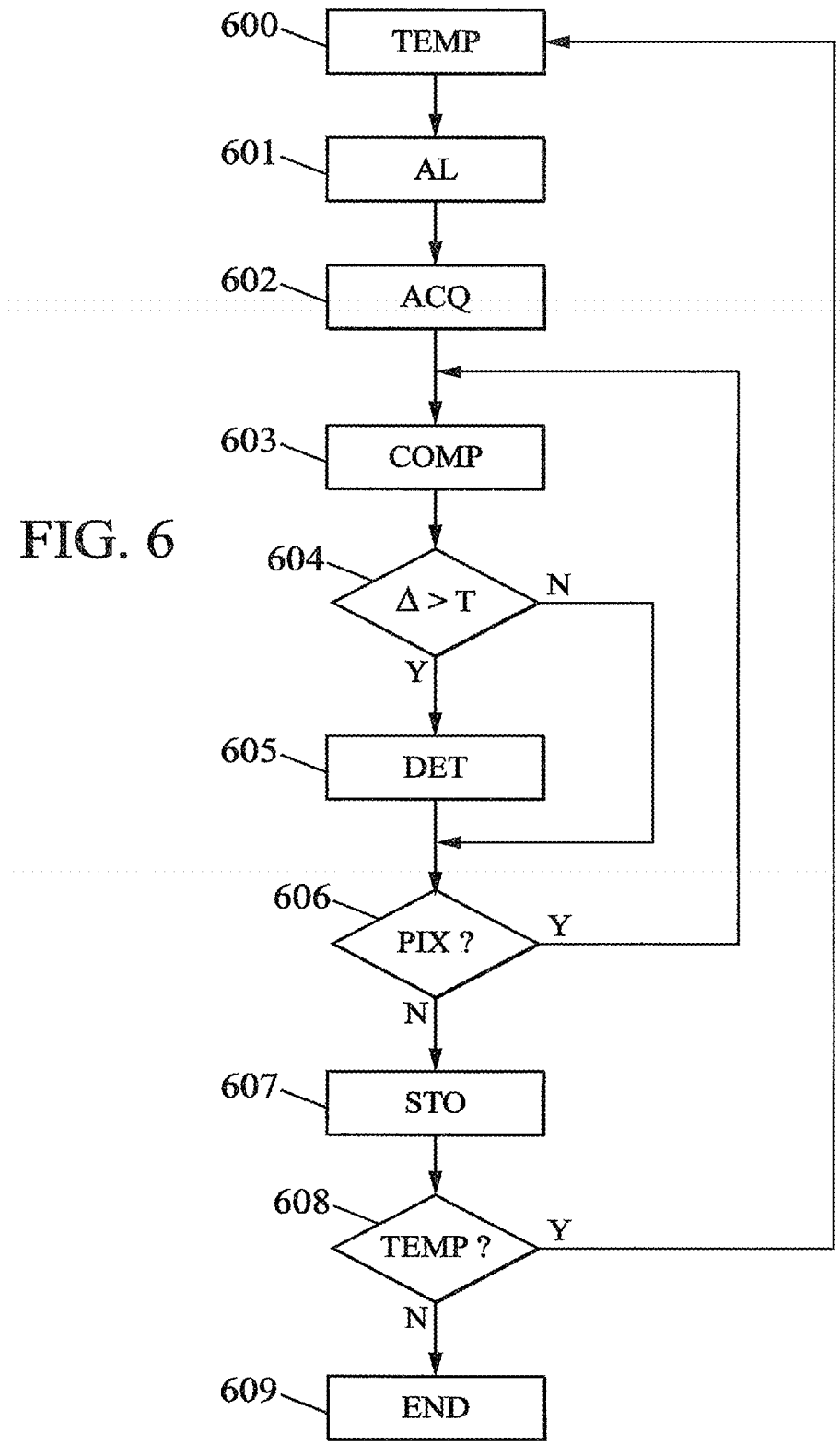
FIG. 6 is a diagram illustrating the steps of a method according to an embodiment of the invention.

FIG. 6 is a diagram illustrating the steps of a method for calibrating the light source 2, according to an embodiment of the invention.

In an optional step 600, the light module 2 is set to a given temperature value. "Set to a temperature" describes the act of placing the light module 2 in an environment with a temperature corresponding substantially to the given temperature value. The accuracy of the temperature setting can be improved without adding additional sensors, by accessing the temperature picked up by the temperature sensor 208 of the light module 2. Alternatively, "setting the temperature" can be performed by switching on the light source for a duration allowing it to have a stabilized temperature.

Figure 3:
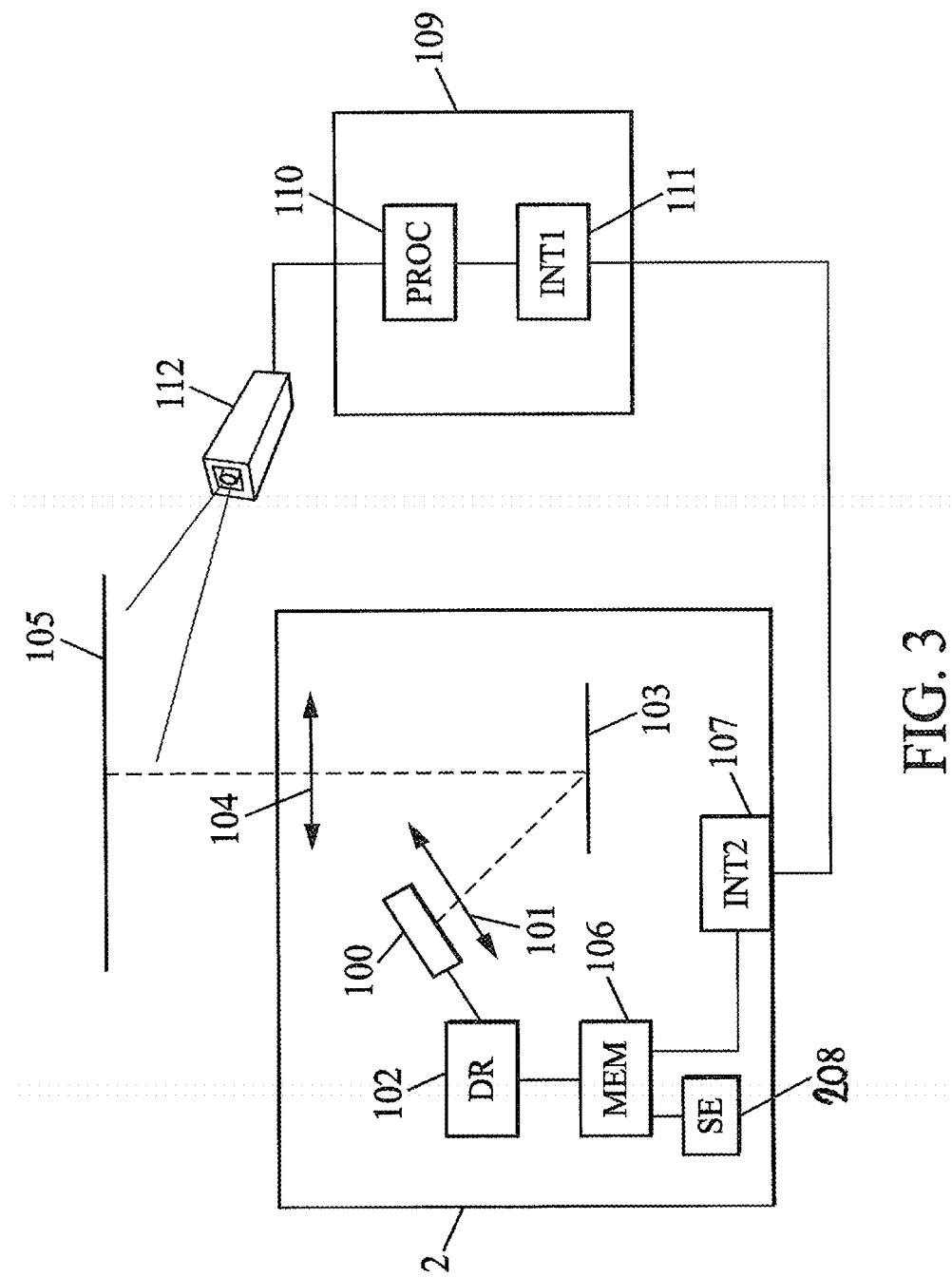
FIG. 3 illustrates a system for calibrating a light module according to an embodiment of the invention.

In a step 601, all of the light-emitting elements of the light source 100 are powered by the driver circuit 102. In the example described hereinbelow, and in order to clarify the explanation of the invention, all the subsets are powered with one and the same current value. It will however be understood that, depending on the light function to be produced, the subsets of light-emitting elements can be powered by respective currents. The command to power the light source can be from a control unit not represented in FIG. 3. The control unit can be incorporated in the light module 2 or, alternatively, can be incorporated in the calibration module 109 which then sends a switch-on command to the light module 2 to trigger the powering of the light source 100 by the driver unit 102.

When the light source 2 is powered, a projected image is obtained on the screen 105, such as the projected image illustrated in FIG. 2 for example. Each pixel of the projected image corresponds to at least one subset of light-emitting elements.

The image projected onto the screen 105 is acquired in a step 602 by the camera 112, then transmitted to the processor 110 for processing.

The projected image acquired by the camera can be compared, pixel by pixel, to a reference image, in a step 603. As explained hereinabove, in the example considered, the reference image is a white image in which all the pixels have an equal light intensity.

Thus, for a first pixel of the projected image, the step 603 consists in comparing a difference between a light intensity of the first pixel and a light intensity of a corresponding pixel of a reference image, and a predetermined threshold. Corresponding pixel denotes a pixel having substantially the same spatial coordinates in the reference image, as the first pixel in the image projected and acquired. To this end, the image projected and acquired can be redimensioned to be of a size and of a format comparable to the reference image.

The predetermined threshold can correspond to a given number of candelas for example. The higher the predetermined threshold, the lesser the correction made by the calibration method. On the contrary, a predetermined threshold of low value makes it possible to obtain a projected image very close to the reference image.

In a step 604, following the comparison step 603, a check is made as to whether the comparison is positive, that is to say whether the difference obtained is above the predetermined threshold.

If such is the case, the method continues to the step 605. Otherwise, the method goes directly to the step 606.

In the step 605, based on the difference between the light intensity of the first pixel and the light intensity of the corresponding pixel, the processor 110 can determine a modified power supply value of at least one first light-emitting element of the subset corresponding to the first pixel.

In the case where the calibration module 109 has access to the current values delivered by the driver unit 102 of the light module 2, the modified power supply value can be a current value, expressed in amperes. However, it is possible that the calibration module 109 does not have access to the values of the power supply delivered by the driver unit 102, in which case the modified power supply value can be a multiplying factor, which will then be able to be applied to the driver unit 102 to power the first light-emitting element of the subset corresponding to the first pixel.

For example, if the first pixel is more bright that the corresponding pixel in the reference image, the multiplying factor is less than 1 so as to reduce the current delivered to the first light-emitting element of the subset, in the case where the light-emitting element can be driven in isolation from the other light-emitting elements of the same subset. Otherwise, the current delivered to the subset comprising the first element is reduced.

In the case where the first pixel is less bright than the corresponding pixel in the reference image, the multiplying factor is greater than 1 so as to increase the current delivered to the first light-emitting element of the subset, in the case where the first light-emitting element can be driven in isolation from the other light-emitting elements of the same subset. Otherwise, the current delivered to the subset comprising the first element is increased.

In a step 606, a check is made as to whether the comparison step 603 has been performed for all of the pixels of the image projected and acquired. If such is the case, the method continues to the step 607. Otherwise, the steps 603 to 606 are repeated for a next pixel of the image projected and acquired.

In order to allow for an adaptation of the power supply of some of the light-emitting elements of the light source 100, the modified power supply value or values is (are) stored in a step 607 in the memory 106 of the light module 2, in association with an identifier of the subset comprising the light-emitting element for which the modified power supply value has been determined. Note that the memory 106 can be an internal memory of the driver unit 102.

The identifier of the subset identifies, according to a first embodiment, only the subset. This embodiment makes it possible to deal with the case in which the light-emitting elements of one and the same subset cannot be driven individually and all receive the same power supply which is specific to the subset.

As a variant, the identifier of the subset is complemented with an identifier of the light-emitting element to which the modified power supply value applies. This embodiment makes it possible to deal with the case in which the light-emitting elements of one and the same subset can be driven individually. In this case, the step 607 consists in storing the modified power supply value in association with the identifier of the subset and with the identifier of the light-emitting element for which the modified power supply value has been determined.

In the case where the temperature-setting step 600 has been implemented, the step 607 can consist in storing the modified power supply value in association with the identifier of the subset, possibly with the identifier of the light-emitting element, and, additionally, with the temperature value of the temperature-setting step 600. The temperature value can be either derived from the temperature sensor 208 or be transmitted by the calibration unit 109.

According to one embodiment, the method is iterated for different temperature settings with different temperature values, so as to advantageously obtain several calibrations of the light module at different temperatures. In this case, a check is made in the step 608 as to whether other temperature settings remain to be performed. If such is the case, the method is iterated and returns to the step 600 for a temperature-setting to a temperature value different from that of the preceding iteration. Otherwise, the calibration method is completed in a step 609.

To perform a calibration for different electrical power supply levels, the steps 601 to 607 are repeated for a given temperature by varying the power supply level in the step 601.

The storage of modified power supply values in the light module 2 makes it possible to adapt the power supply of the light-emitting elements to the production and mounting defects of the light module 2, when the driver unit 102 powers the different light-emitting elements as a function of the initial or modified power supply values which are stored in the memory 106.

In the case where a subset of light-emitting elements is stored in association with several modified power supply values and respective temperature values, the driver unit 102 can take into account a current temperature picked up by the temperature sensor 208 to select one out of several modified power supply values. The driver unit 102 can for example select the modified power supply value associated with the temperature value closest to the current.

Thus, the present invention makes it possible to compensate for the production and mounting defects, and more generally any defect of the light module, without requiring modification of the optical hardware of the light module 2. Such a calibration is in particular allowed by the use of a source comprising light-emitting elements such as light-emitting rods of submillimetric dimensions. Furthermore, such light-emitting elements generally accept a power supply that is different from a nominal power supply value which allows the implementation of the invention.

Another means of compensating for the defects of the light module would be, in the case of a light module 2 as illustrated in detail in FIG. 2, to modify the reflection coefficients of the matrix of micromirrors DMD 103, in order to augment the reflection coefficients, or ON/OFF ratio in the dark zones of the projected image and to reduce the reflection coefficients in the excessively bright zones of the projected image.

Such an alternative solution does however present the drawback of having to keep a margin to be able to augment the ON/OFF ratio. The matrix of micromirrors DMD 103 is thus not used optimally and the beam obtained has a reduced overall intensity. The solution presented with reference to the figures described hereinabove has the advantage of not presenting such a drawback.

Obviously, the invention is not limited to the embodiments described previously and supplied purely by way of example. It encompasses various modifications, alternative forms and other variants that the person skilled in the art will be able to envisage in the context of the present invention and particularly in all combinations of the different embodiments described previously.

The invention claimed is:

1. A light module comprising:
   at least one light source comprising a set of light-emitting elements arranged on the same substrate, the set of light-emitting elements comprising subsets of the light emitting elements with each subset comprising at least one of the light-emitting elements and each subset being powered individually with current, wherein the set of light emitting elements simultaneously emit a pixelated beam with each subset of the light emitting elements corresponding to a pixel of the pixelated beam;
   a memory storing in association with an identifier of each of the subsets of light-emitting elements, a plurality of predetermined temperature values and a plurality of power supply values corresponding to the predetermined temperature values respectively;
   a driver powering each of the subsets of the set of light-emitting elements based on the associated power supply values; and
   a temperature sensor measuring a current temperature value for each of the subsets of light-emitting elements,
   wherein,
   for each subset of light emitting elements, the driver is configured to compare the measured current temperature value of the subset with each of the stored predetermined temperature values of the subset, and select a stored power supply value associated with the stored predetermined temperature value that is closest to the measured current temperature value, and
   wherein the driver is configured to power each of the subsets with a different selected power supply value such that the pixelated beam forms an image with uniform appearance across pixels corresponding to the subsets.

2. The light module according to claim 1, comprising a focussing optical element focussing a light beam from the at least one light source, an imager spatially modulating a light intensity of the light beam focused by the focusing optical element, and a projector projecting the light beam spatially modulated by the imager towards an outside of the light module.

3. The light module according to claim 2, wherein the imager is a matrix of micromirrors.

4. The set of light module according to claim 1, wherein the light-emitting elements are light-emitting rods of submillimetric dimension.

5. The light module according to claim 1, wherein the light-emitting elements are light-emitting rods of submillimetric dimension.

6. The light module according to claim 2, wherein the light-emitting elements are light-emitting rods of submillimetric dimension.

7. The light module according to claim 3, wherein the light-emitting elements are light-emitting rods of submillimetric dimension.

\* \* \* \* \*